(12) United States Patent  (10) Patent No.: US 7,469,544 B2
Farhangi  (45) Date of Patent: Dec. 30, 2008

(54) METHOD AND APPARATUS FOR INJECTING A FUEL INTO A COMBUSTOR ASSEMBLY

(75) Inventor: Shahram Farhangi, Woodland Hills, CA (US)

(73) Assignee: Pratt & Whitney Rocketdyne, Canoga Park, CA (US)

( * ) Notice: Subject to any disclaimer, the term of this patent is extended or adjusted under 35 U.S.C. 154(b) by 583 days.

(21) Appl. No.: 10/683,749

(22) Filed: Oct. 10, 2003

(65) Prior Publication Data

US 2005/0076648 A1  Apr. 14, 2005

(51) Int. Cl.
F01C 1/00 (2006.01)
F02G 3/00 (2006.01)

(52) U.S. Cl. .......................... 60/740; 60/737
(58) Field of Classification Search .................. 60/776, 60/737, 740, 733, 739
See application file for complete search history.

(56) References Cited

U.S. PATENT DOCUMENTS

| | | | |
|---|---|---|---|
| 4,226,087 A * | 10/1980 | Spadaccini | 60/749 |
| 4,731,989 A | 3/1988 | Furuya et al. | |
| 4,870,824 A | 10/1989 | Young | |
| 5,000,004 A * | 3/1991 | Yamanaka et al. | 60/723 |
| 5,003,768 A * | 4/1991 | Kappler et al. | 60/39.23 |
| 5,281,128 A | 1/1994 | Dalla Betta et al. | |
| 5,309,637 A | 5/1994 | Moriarty | |
| 5,431,017 A * | 7/1995 | Kobayashi et al. | 60/723 |
| 5,461,864 A | 10/1995 | Betta et al. | |
| 5,497,611 A * | 3/1996 | Benz et al. | 60/776 |
| 5,511,972 A | 4/1996 | Dalla Betta et al. | |
| 5,512,250 A | 4/1996 | Betta et al. | |
| 5,518,697 A | 5/1996 | Dalla Betta et al. | |
| 5,577,906 A | 11/1996 | Hanakata et al. | |
| 5,709,077 A | 1/1998 | Beichel | |
| 5,715,673 A | 2/1998 | Beichel | |

(Continued)

FOREIGN PATENT DOCUMENTS

EP  0 304 707  5/1988

(Continued)

OTHER PUBLICATIONS

Catalytica, How it Works, http://www.catalyticaenergy.com/xonon/how_it_works.html, printed Feb. 6, 2002, 3 pages printed article only.

(Continued)

Primary Examiner—William H Rodriguez
(74) Attorney, Agent, or Firm—Carlson, Gaskey & Olds PC

(57) ABSTRACT

A combustor assembly including an injector element able to inject and substantially mix a fuel with a vitiated air stream, so that the substantially all of the fuel injected into the vitiated air stream reaches an auto ignition temperature before it combusts. Generally, the injector element expels the fuel from the injector orifice at a rate, a velocity, a trajectory, or a flow geometry able to mix the fuel with the vitiated air. Generally, the fuel is able to mix with the vitiated air in such a manner that the fuel is substantially mixed and no substantially high or substantially low concentrations of fuel exist in the air stream at the time that the fuel reaches the auto ignition temperature.

26 Claims, 7 Drawing Sheets

U.S. PATENT DOCUMENTS

| | | | |
|---|---|---|---|
| 5,899,679 | A | 5/1999 | Euzen et al. |
| 5,956,937 | A | 9/1999 | Beichel |
| 5,970,702 | A | 10/1999 | Beichel |
| 6,170,264 | B1 | 1/2001 | Viteri et al. |
| 6,174,159 | B1 | 1/2001 | Smith et al. |
| 6,192,688 | B1 | 2/2001 | Beebe |
| 6,199,368 | B1 * | 3/2001 | Onoda et al. ............ 60/39.463 |
| 6,202,402 | B1 | 3/2001 | Sattelmayer |
| 6,205,768 | B1 | 3/2001 | Dibble et al. |
| 6,358,040 | B1 | 3/2002 | Pfefferle et al. |
| 6,415,608 | B1 | 7/2002 | Newburry |
| 6,442,939 | B1 * | 9/2002 | Stuttaford et al. ............ 60/737 |
| 6,584,760 | B1 | 7/2003 | Lipinski et al. |
| 6,662,564 | B2 * | 12/2003 | Bruck et al. ................. 60/723 |
| 6,923,001 | B2 * | 8/2005 | Laster et al. ................. 60/723 |
| 6,981,358 | B2 * | 1/2006 | Bellucci et al. ............ 60/39.17 |
| 7,003,958 | B2 * | 2/2006 | Dinu et al. .................... 60/737 |
| 7,007,486 | B2 * | 3/2006 | Sprouse et al. ................ 60/776 |
| 7,017,329 | B2 * | 3/2006 | Farhangi et al. ............ 60/39.11 |
| 7,111,463 | B2 * | 9/2006 | Sprouse et al. ................ 60/776 |
| 7,117,674 | B2 * | 10/2006 | Sprouse et al. ................ 60/723 |
| 7,117,676 | B2 * | 10/2006 | Farhangi et al. ............... 60/736 |
| 7,121,097 | B2 * | 10/2006 | Yee et al. ...................... 60/777 |
| 7,140,184 | B2 * | 11/2006 | Sprouse et al. ................ 60/743 |
| 2002/0139119 | A1 | 10/2002 | Touchton et al. |
| 2003/0056519 | A1 | 3/2003 | Newberry |
| 2006/0236700 | A1 * | 10/2006 | Saitoh et al. .................. 60/737 |

FOREIGN PATENT DOCUMENTS

| | | |
|---|---|---|
| EP | 0 889 289 | 6/1998 |
| JP | 58-179730 | 10/1983 |
| JP | 59-107119 | 6/1984 |
| JP | 60-66022 | 4/1985 |
| JP | 60-64131 | 12/1985 |
| WO | WO 02/27243 | 4/2002 |

OTHER PUBLICATIONS

Catalytica, How it Works, http://www.catalyticaenergy.com/xonon/how_it_works1.html, printed Feb. 6, 2002, 7 pages printed article only.

* cited by examiner

METHOD AND APPARATUS FOR INJECTING A FUEL INTO A COMBUSTOR ASSEMBLY

FIELD OF THE INVENTION

The present invention relates generally to gas powered turbines for generating power, and more particularly to a low nitrous oxide emission combustion system for gas powered turbine systems.

BACKGROUND OF THE INVENTION

It is generally known in the art to power turbines with gases being expelled from combustion chambers. These gas powered turbines can produce power for many applications such as terrestrial power plants. In the gas powered turbine a fuel, such as a hydrocarbon (for example methane or kerosene) or hydrogen, is combusted in an oxygen rich environment. Generally, these combustion systems have high emissions of undesirable compounds such as nitrous oxide compounds (NOX) and carbon containing compounds. It is generally desirable to decrease these emissions as much as possible so that undesirable compounds do not enter the atmosphere. In particular, it has become desirable to reduce NOX emissions to a substantially low amount. Emissions of NOX are generally desired to be non-existent, and are accepted to be non-existent, if they are equal to or less than about one part per million volume of dry weight emissions.

In a combustion chamber fuel, such as methane, is combusted in atmospheric air where temperatures generally exceed about 1427° C. (about 2600° F.). When temperatures are above 1427° C., the nitrogen and oxygen compounds, both present in atmospheric air, undergo chemical reactions which produce nitrous oxide compounds. The energy provided by the high temperatures allows the breakdown of dinitrogen and dioxygen, especially in the presence of other materials such as metals, to produce NOX compounds such as $NO_2$ and NO.

It has been attempted to reduce NOX compounds by initially heating the air before it enters the combustion chambers to an auto ignition temperature. If the air enters the combustion chamber at an auto ignition temperature, then no flame is necessary to combust the fuel. Auto ignition temperatures are usually lower than pilot flame temperatures or the temperatures inside recirculation flame holding zones. If no flame is required in the combustion chamber, the combustion chamber temperature is lower, at least locally, and decreases NOX emissions. One such method is to entrain the fuel in the air before it reaches the combustion chamber. This vitiated air, that is air which includes the fuel, is then ignited in a pre-burner to raise the temperature of the air before it reaches the main combustion chamber. This decreases NOX emissions substantially. Nevertheless, NOX emissions still exist due to the initial preburning. Therefore, it is desirable to decrease or eliminate this pre-burning, thereby substantially eliminating all NOX emissions.

Although the air is heated before entering the main combustion chamber, it may still be ignited in the combustion chamber to combust the remaining fuel. Therefore, an additional flame or arc is used to combust remaining fuel in the main combustion chamber. This reduces the temperature of the igniter, but still increases the temperature of the combustion chamber. In addition, no fuel is added to the air as it enters the combustion chamber. Rather all the fuel has already been entrained in the air before it enters the combustion chamber to be combusted. This greatly reduces control over where combustion occurs and the temperature in the combustion chamber Other attempts to lower NOX emissions include placing catalysts in catalytic converters on the emission side of the turbines. This converts the NOX compounds into more desirable compounds such as dinitrogen and dioxygen. These emission side converters, however, are not one hundred percent efficient thereby still allowing NOX emissions to enter the atmosphere. The emission converters also use ammonia $NH_3$, gas to cause the reduction of NOX to $N_2$. Some of this ammonia is discharged into the atmosphere. Also, these converters are expensive and increase the complexity of the turbine and power production systems. Therefore, it is also desirable to eliminate the need for emission side catalytic converters.

SUMMARY

A combustor assembly including an injector element able to inject and substantially mix a fuel with a vitiated air stream, so that the substantially all of the fuel injected into the vitiated air stream reaches an auto ignition temperature before it combusts. Generally, the injector element expels the fuel from the injector orifice at a rate, a velocity, a trajectory, or a flow geometry able to mix the fuel with the vitiated air. Generally, the fuel is able to mix with the vitiated air in such a manner that the fuel is substantially mixed and no substantially high or substantially low concentrations of fuel exist in the air stream at the time that the fuel reaches the auto ignition temperature.

According to various embodiments a combustion system for a gas powered turbine to substantially mix and combust a fuel, to assist in substantially eliminating selected emissions is disclosed. The combustion system includes an oxidizer flow pathway through which an oxidizer flows in a selected direction out an outlet into a combustion area. An injector plate disposed near the outlet and an injector port is defined by the injector plate. A fuel manifold region is operably associated with the injector plate. A fuel disposed in the injector manifold region is operable to be injected into the combustion area and substantially mix with the fuel before the fuel reaches an ignition temperature.

According to various embodiments an injector plate, for a combustor in a gas powered turbine, for injecting a fuel into a combustion area to be combusted by a high energy oxidizer stream is disclosed. The injector plate includes an oxidizer pathway to allow the high energy oxidizer to flow through the injector plate to the combustion area. A fuel injector is disposed near the oxidizer pathway to inject a selected portion of the fuel into the high energy oxidizer stream. The fuel injector includes an injector outlet from which the fuel is let out and a swirl initiator to initiate a force of the fuel in a direction generally tangential to a direction of the flow of the fuel out of the outlet. The fuel substantially mixes with the high energy oxidizer fuel stream.

According to various embodiments an injector plate, is disclosed, for injecting a fuel into a combustion area of a combustor for a gas powered turbine to be combusted by a high energy oxidizer stream. The injector includes a plurality of oxidizer pathways to allow the high energy oxidizer to flow through the injector plate to the combustion area. A fuel injector is disposed near the plurality of oxidizer pathways to inject a selected portion of the fuel into the high energy oxidizer stream. The fuel injector includes an injector outlet from which the fuel is let out. The injector outlet spans at lest a sub-plurality of the plurality of the oxidizer pathways to inject the fuel in a generally dispersed manner. The fuel substantially mixes with the high energy oxidizer fuel stream.

According to various embodiments a method of mixing a fuel with an oxidizer stream to initiate combustion of the fuel at a selected time is disclosed. The method includes forming a high energy oxidizer stream and flowing the high energy oxidizer stream in a first direction. A selected portion of the high energy air stream is outlet at an oxidizer outlet. A fuel stream is injected, including an axial direction and a motion tangential to the axial direction, near the oxidizer outlet.

According to various embodiments a method of mixing a fuel with an oxidizer stream to initiate combustion of the fuel at a selected time is disclosed. The method includes forming a high energy oxidizer stream and flowing the high energy oxidizer stream in a first direction. A selected portion of the high energy oxidizer air stream is outlet at an oxidizer outlet and a fuel stream is injected from a fuel injector slot relative to a plurality of the oxidizer outlets from the fuel slot.

Further areas of applicability of the present invention will become apparent from the detailed description provided hereinafter. It should be understood that the detailed description while indicating the various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6b is a detailed cross-sectional view of the injector plate taken along line 6b in FIG. 6a;

FIG. 7b is a detailed cross-sectional view of the injector plate taken along line 7b in FIG. 7a;

DETAILED DESCRIPTION OF VARIOUS EMBODIMENTS

The following description of various embodiments is merely exemplary in nature and is in no way intended to limit the invention, its application, or uses. Specifically, although the following combustor is described in conjunction with a terrestrial gas powered turbine, it may be used in other systems. Furthermore, the mixer and heat exchanger may be used in systems other than turbine systems.

Figure 1:
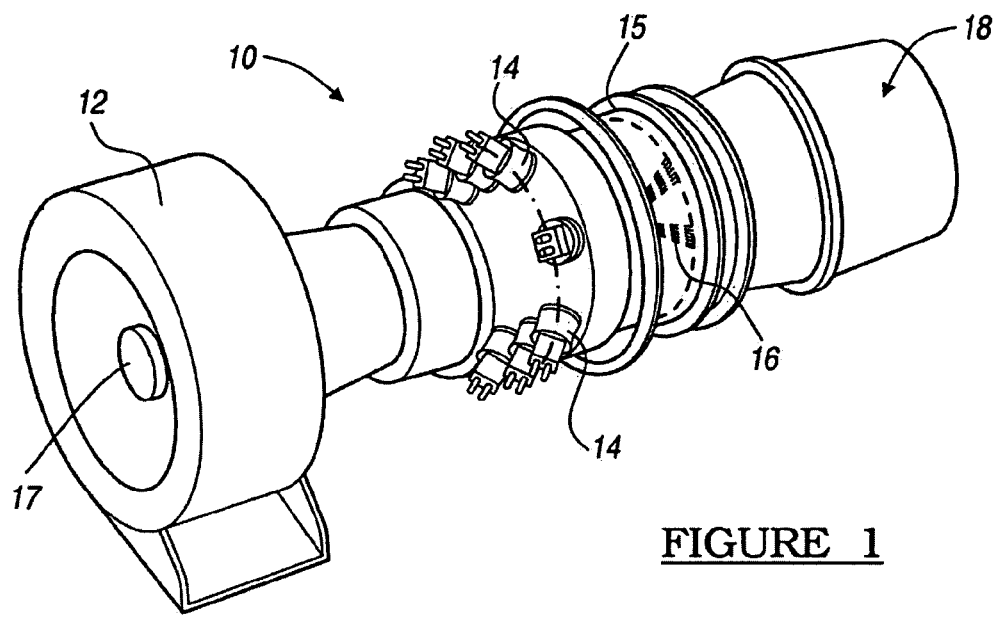
FIG. 1 is a perspective view of a gas powered turbine including a combustor in accordance with the present invention.

Referring to FIG. 1, a gas powered turbine 10 in accordance with a preferred embodiment of the present invention is shown. The gas powered turbine 10 may use several different gaseous fuels, such as hydrocarbons (including methane, natural gas, propane, kerosene, and other generally known combustible fuels), hydrogen, SYNTHESIS fuels, and any other appropriate fuel, that are combusted and that expand to move portions of the gas powered turbine 10 to produce power. An important component of the gas powered turbine 10 is a compressor 12 which forces atmospheric air into the gas powered turbine 10. Also, the gas powered turbine 10 includes several combustion chambers 14 for combusting fuel. The combusted fuel is used to drive a turbine 15 including turbine blades or fans 16 which are axially displaced in the turbine 15. There are generally a plurality of turbine fans 16, however, the actual number depends upon the power the gas powered turbine 10 is to produce. Only a single turbine fan is illustrated for clarity.

In general, the gas powered turbine 10 ingests atmospheric air and combusts a fuel which powers the turbine fans 16. Essentially, air is pulled in and compressed with the compressor 12, which generally includes a plurality of concentric fans which grow progressively smaller along the axial length of the compressor 12. The fans in the compressor 12 are all powered by a singleshaft. The high pressure air then enters the combustion chambers 14 where fuel is added and combusted. The fuel is combusted such that gases are expanded out of the combustion chamber 14 to engage the turbine fans 16 which, due to aerodynamic and hydrodynamic forces, spins the turbine fans 16. The gases form an annulus that spin the turbine fans 16, which are affixed to a shaft (not shown). Generally, there are at least two turbine fans 16. One or more of the turbine fans 16 may engage the same shaft that the compressor 12 engages.

The gas powered turbine 10 is self-powered since the spinning of the turbine fans 16 also powers the compressor 12 to compress air for introduction into the combustion chambers 14. Other turbine fans 16 are affixed to a second shaft 17 which extends from the gas powered turbine 10 to power an external device. After the gases have expanded through the turbine fans 16, the gases are expelled out through an exhaust port 18. It will be understood that gas powered turbines are used for many different applications such as engines for vehicles and aircraft or for power production in a terrestrially based gas powered turbine 10.

The gases which are exhausted from the gas powered turbine 10 include many different chemical compounds that are generated from the combustion of the atmospheric air in the combustion chambers 14. If only pure oxygen and pure hydrocarbon fuel, were combusted, absolutely completely and stoichiometrically, then the exhaust gases would include only carbon dioxide and water. Atmospheric air, however, is not 100% pure oxygen and includes many other compounds such as nitrogen and other trace compounds. Therefore, in the high energy environment of the combustion chambers 14, many different compounds may be produced. All of these compounds exit the exhaust port 18.

It is generally known in the art that an equivalence ratio is determined by dividing the actual ratio of fuel and air by a stoichiametric ratio of fuel to air (where there is not an excess of one starting material). Therefore, a completely efficient combustion of pure fuel and oxygen air would equal an equivalence ratio of one. It will be understood that although atmospheric air in a hydrocarbon fuel may be preferred for economic reasons, other oxidizers and fuels may be provided. The air simply provides an oxidizer for the fuel.

It will be understood that the gas powered turbine 10 may include more than one combustion chamber 14. Any reference to only one combustion chamber 14, herein, is for clarity of the following discussion alone. The present invention may be used with any oxidizer or fuel which powers the gas powered turbine 10. Moreover, the combustion chamber 14 may combine any appropriate fuel. Air is simply an exemplary oxidizer and hydrocarbons an exemplary fuel.

Figure 2:
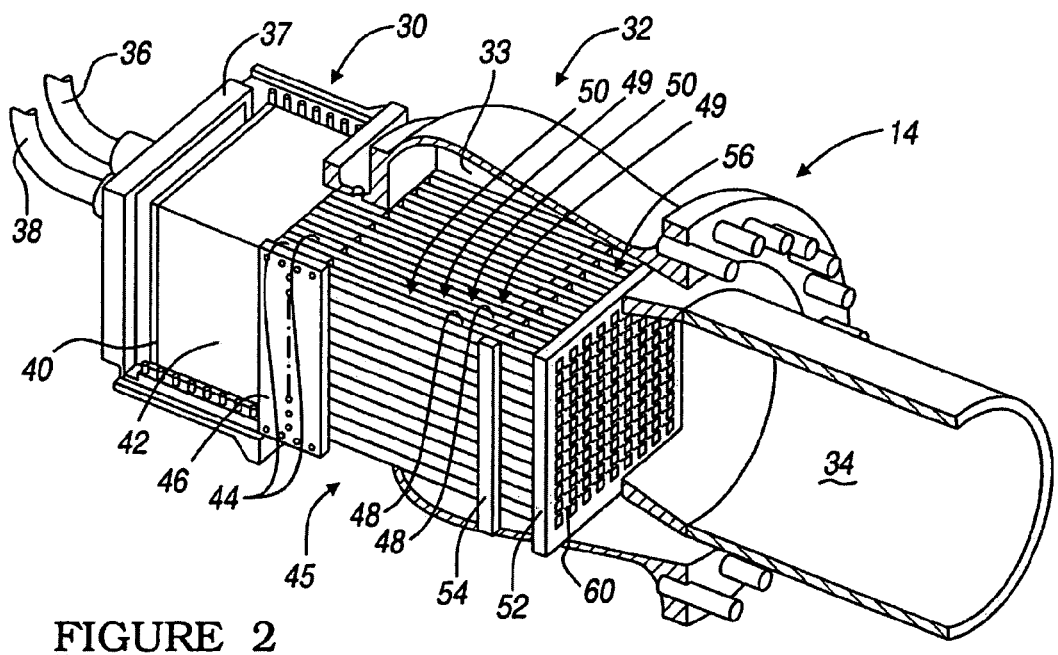
FIG. 2 is a partial cross-sectional perspective view of a single combustor.

With reference to FIG. 2, one exemplary combustion chamber 14 is illustrated. The combustion chamber may comprise any appropriate combustion chamber such as the one described in U.S. patent application Ser. No. 10/120,268 filed Apr. 10, 2002 entitled, "A Catalytic Combustor For Substantially Eliminating Nitrous Oxide Emissions," and U.S. patent application Ser. No. 10/397,394, entitled "A Catalytic Combustor and Method for Substantially Eliminating Nitrous Oxide Emissions, filed Mar. 26, 2003, both of which are incorporated herein by reference. The combustion chamber 14 includes a premix section 30, a heat exchange or pre-heat section 32 generally enclosed in a heat exchange chamber 33, and a main combustion area 34. A first or premix fuel line 36 provides fuel to the premix section 30 through a fuel manifold 37 while a second or main fuel line 38 provides fuel to the main combustion area 34 through a main injector 52. Positioned in the premix section 30 is a premix injector 40 which injects fuel from the first fuel line 36 into a premix chamber 42. Air from the compressor 12 enters the premix section 30 through a plurality of cooling tubes 44 of a heat exchanger or pre-heater 45 (detailed in FIG. 3). A premix chamber 42 encompasses a volume between the premix injector 40 and the exit of the cooling tubes 44.

Figure 4:
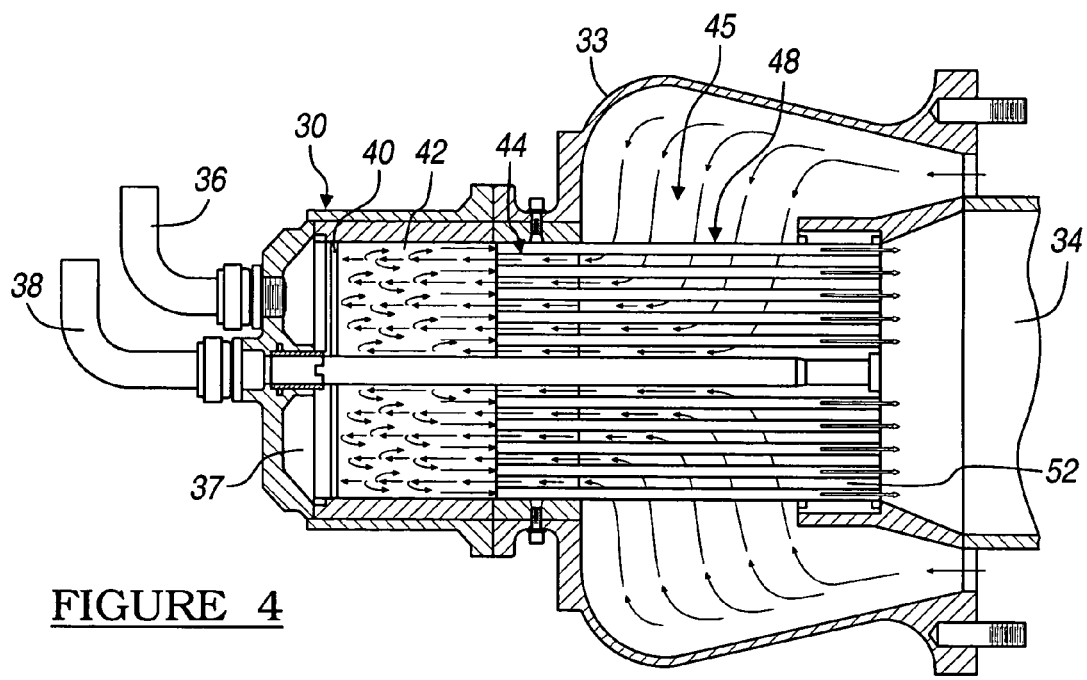
FIG. 4 is a simplified diagrammatic view of the flow of air through the combustion chamber according to a first embodiment of the present invention.

With further reference to FIG. 2, a plurality of catalytic or heat exchange tubes 48 extend into the heat exchange section 32. The heat exchange tubes 48 are spaced laterally apart. The heat exchange tubes 48, however, are not spaced vertically apart. This configuration creates a plurality of columns 49 formed by the heat exchange tubes 48. Each heat exchange tube 48, and the column 49 as a whole, define a pathway for air to travel through. The columns 49 define a plurality of channels 50. It will be understood this is simply exemplary and the tubes may be spaced in any configuration to form the various pathways. Extending inwardly from the walls of the heat exchange chamber 33 may be directing fins (not particularly shown). The directing fins direct the flow of air to the top and the bottom of the heat exchange chamber 33 so that air is directed to flow vertically through the channels 50 defined by the heat exchange tubes 48 (FIG. 4).

Near the ends of the heat exchange tubes 48, where the heat exchange tubes 48 meet the main combustion area 34, is a injector plate 52. The second fuel line 38 provides fuel to the injector plate 52 so that fuel may be injected at the end of each heat exchange tube 48. Spaced away from the injector plate 52, towards the premix section 30, is an intra-propellant plate 54. The intra-propellant plate 54 separates the air that is traveling through the channels 50 and the fuel that is being fed to the fuel manifold region 56 between the injector plate 52 and intra-propellant plate 54. It will be understood, that the intra-propellant plate 54 is effectively a solid plate, though not literally so in this embodiment. The placement of the heat exchange tubes 48 dictate that the intra-propellant plate 54 be segmented wherein one portion of the intra-propellant plate 54 is placed in each channel 50 between two columns 49.

Air which exits out the heat exchange tubes 48 is entrained with fuel injected from a fuel injector port 60 (illustrated more clearly herein according to various embodiments) formed in the injector plate 52 and this fuel then combusts in the main combustion area 34. The main combustion area 34 directs the expanding gases of the combusted fuel to engage the turbine fans 16 so that the expanded gases may power the turbine fans 16.

Figure 3:
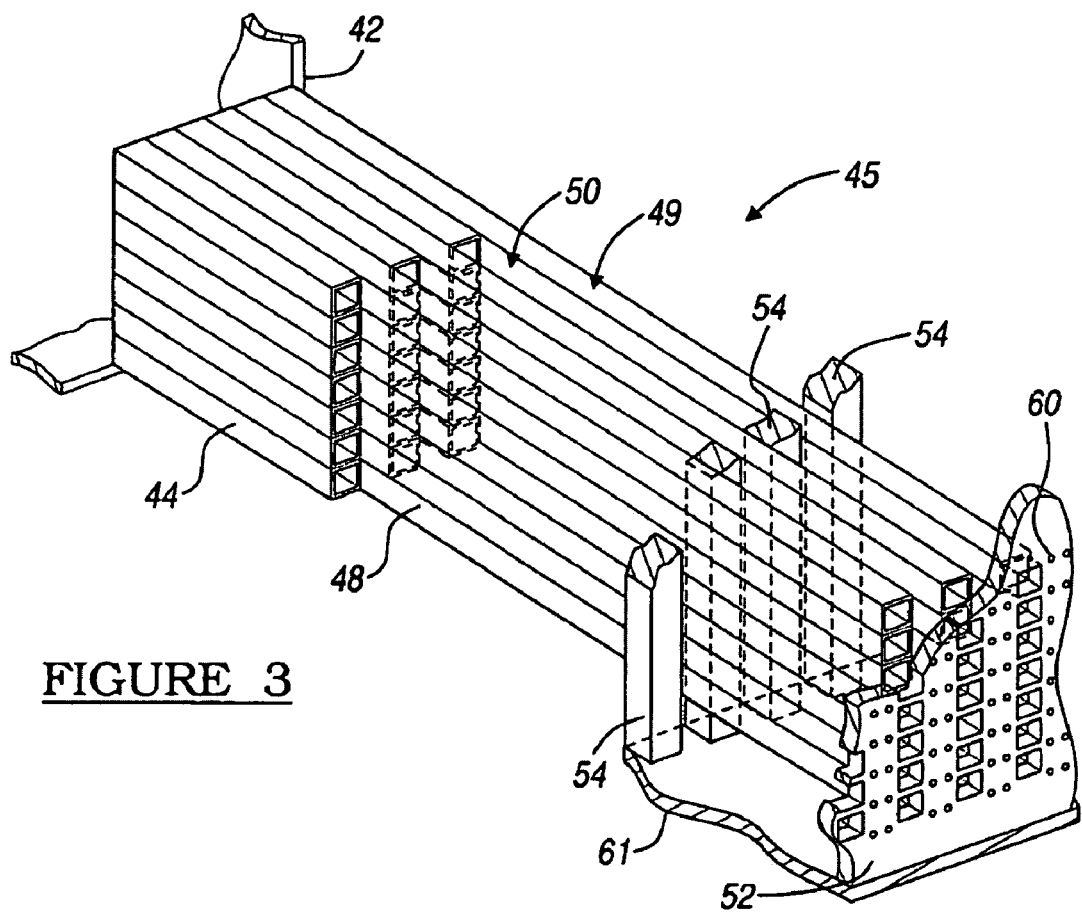
FIG. 3 is a detailed, partial cross-sectional, perspective view of a portion of the heat exchanger.

Turning reference to FIG. 3, a detailed portion of the heat exchanger 45 is illustrated. Although, in one embodiment, the heat exchanger 45 includes a large plurality of tubes, as generally shown in FIG. 2, only a few of the heat exchange tubes 48 and cooling tubes 44 are illustrated here for greater clarity. The heat exchanger 45 is similar to that described in U.S. Pat. No. 5,309,637 entitled "Method of Manufacturing A Micro-Passage Plate Fin Heat Exchanger", incorporated herein by reference. The heat exchanger 45 includes a plurality of cooling tubes 44 disposed parallel to and closely adjacent the heat exchange tubes 48. Each of the cooling tubes 44 and the heat exchange tubes 48 have a generally rectangular cross section and can be made of any generally good thermally conductive material. Preferably, the heat exchange tubes 48 and the cooling tubes 44 are formed of stainless steel. It will be appreciated that while the cooling tubes 44 and the heat exchange tubes 48 are shown as being substantially square, the cross-sectional shape of the components could comprise a variety of shapes other than squares. It is believed, however, that the generally square shape will provide the best thermal transfer between the tubes 44, 48.

Both the cooling tubes 44 and the heat exchange tubes 48 may be of any appropriate size, but preferably each are generally square having a width and height of between about 0.04 inches and about 1.0 inches (between about 0.1 centimeters and about 2.5 centimeters). The thickness of the walls of the cooling tubes 44 and the heat exchange tubes 48 may be any appropriate thickness. The walls need to be strong enough to allow the fluids to flow through them, but still allow for an efficient transfer of heat between the inside of the heat exchange tubes 48 and the air in the channels 50 and cooling tubes 44. The thickness may also vary by size and material choice.

The cooling tubes 44 extend parallel to the heat exchange tubes 48 for a portion of the length of the heat exchange tubes 48. Generally, each of the cooling tubes 44 is brazed to one of the heat exchange tubes 48 for the distance that they are placed adjacent one another. Moreover, the cooling tubes 44 and the heat exchange tubes 48 may be brazed to one another. The cooling tubes 44 extend between the columns 49 of the heat exchanger tubes 48. According to various embodiments, brazing materials are those with melting temperatures above about 538° C. (about 1000° F.). The cooling tubes 44 extend between the columns 49 of the heat exchanger tubes 48. The cooling tubes 44 and the heat exchange tubes 48, when brazed together, form the heat exchanger 45 which can provide a surface-to-surface exchange of heat. It will be understood, however, that air traveling in the channels 50 between the heat exchange tubes 48 will also become heated due to the heat transferred from the heat exchange tubes 48 to the air in the channels 50.

Referring further to FIG. 3, the fuel injector ports 60 are formed in the injector plate 52. The fuel injector ports 60 may be provided in any appropriate number. According to various embodiments, there is a ratio of heat exchange tubes 48 to fuel injector ports 60 of 4:1. It will be understood, however, that any appropriate ratio of the fuel injector ports 60 to the heat exchange tubes 48 may be provided. The fuel is provided to the manifold region 56 which is bound by the intra-propellant plate 54, the injector plate 52, and a manifold plate 61. The manifold plate 61 may underlay, overlay, or surround the manifold region 56. This provides fuel to each of the fuel injector ports 60 without requiring an individual fuel line to each fuel injector port 60. Therefore, as air exits each heat exchange tube 48, fuel is injected from the fuel injector port 60 to the stream of air emitted from each heat exchange tube 48. In this way, the fuel can be very efficiently and quickly distributed throughout the air flowing from the heat exchanger 45, as discussed further herein.

On the interior walls of each heat exchange tube 48 is disposed a coating of a catalyst. The catalyst may be any appropriate catalyst that is able to combust a hydrocarbon fuel, and may include, for example, platinum, palladium, or mixtures thereof. The catalyst is able to combust a hydrocarbon fuel, such as methane, without the presence of a flame or any other ignition source. The catalyst is also able to combust the fuel without generally involving any side reactions. Therefore, the combustion of fuel does not produce undesired products. It will be understood that if the fuel is not a hydrocarbon then a different, appropriate catalyst is used. The catalyst allows combustion of the fuel without an additional heat source.

Figure 5:
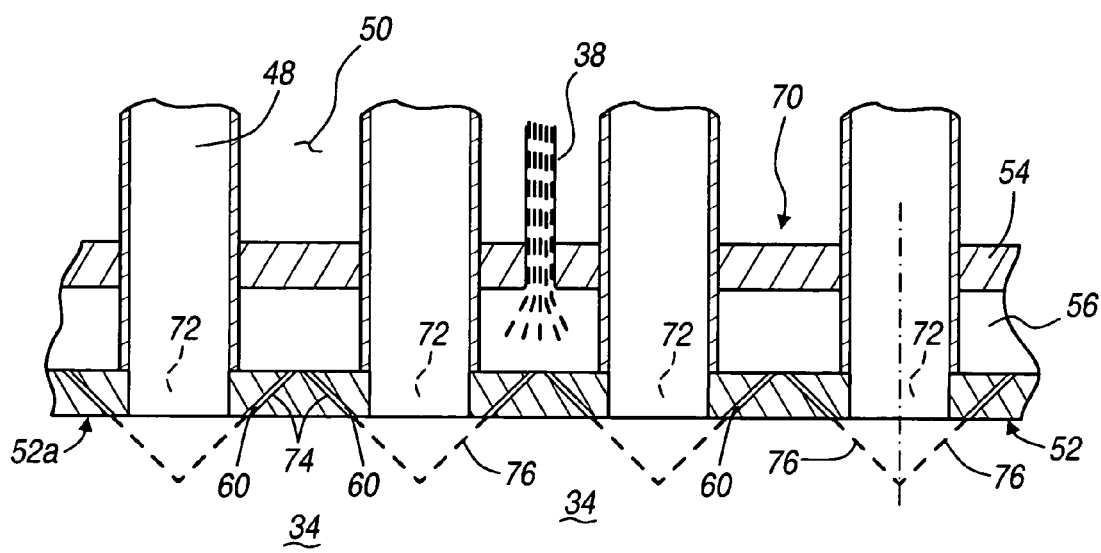
FIG. 5 is a detailed, cross-sectional view of a portion of the main injectors.

With continuing reference to FIGS. 1-3 and further reference to FIG. 4, a method of using the combustion chamber 14 according to various embodiments will be described. The combustion chamber 14 includes a premix chamber 42 which may be formed in any appropriate manner. The premix chamber 42 may include an open region, as illustrated in FIG. 4, or may include a plurality of the cooling tubes 44, as illustrated in FIG. 5, and described further herein. When an open region is used as the premix chamber 42 the flow generally follows the path indicated by the arrows in FIG. 4. It will also be understood that a plurality of tubes, as described above, are present in the heat exchanger, but have been removed for clarity in the present description of the air flow. Atmospheric air is compressed in the compressor 12 and then introduced into the heat exchange chamber 33 at a high pressure. The air that enters the heat exchange chamber 33 is directed by the directing fins to the top and bottom of the heat exchange chamber 33 so that the air may flow through the channels 50. The air that enters the heat exchange chamber 33 may be at a temperature between about 37° C. and about 427° C. (about 100° F. and about 800° F.). Generally, however, the air enters the heat exchanger 45 at a temperature of about 204° C. to about 400° C. (about 400° F. to about 750° F.).

As the air travels in the channels 50, the air increases in temperature to become "hot" air. The hot air flows through the pathway formed by the cooling tubes 44 and into the premix section 30. The hot air also receives thermal energy while flowing through the cooling tubes 44. It will be understood that the cooling tubes 44 are adjacent a portion of the heat exchange tubes 48. The temperature of the hot air, as it enters the premix section 30, is between about 427° C. and about 538° C. (about 800° F. and about 1000° F.). The air in the premix section 30 makes a turn within the premix chamber 42. As the air turns inside the premix chamber 42, the premix injector 40 injects fuel into the air, entraining the fuel in the air. About 30% to about 60% of all the fuel used to power the gas powered turbine 10 is entrained in this manner in the premix chamber 42.

After the air enters the premix chamber 42, it then flows out through the pathway formed by the heat exchange tubes 48. In the heat exchange tubes 48, the fuel in the air combusts as it engages the catalyst which is disposed on the inside walls of the heat exchange tubes 48. The catalyst may be disposed within the heat exchange tube 48 in a plurality of ways such as coating by painting or dipping or by affixing seals to the internal walls. As the fuel combusts, the temperature of the air rises to between about 768° C. and 930° C. (between about 1400° F. and about 1700° F.). As the temperature of the air rises, it becomes highly energetic to form high energy air, further the high energy air exits the heat exchange tubes 48. The temperature the high energy air reaches in the heat exchange tubes 48 is at least the hypergolic or auto ignition temperature of the fuel being used in the gas powered turbine 10. Therefore, the high energy air that exits the heat exchange tubes 48 is, and may also be referred to as, hypergolic or auto ignition air. The auto ignition temperature of the air is the temperature that the air may be at or above so that when more fuel is injected into the hypergolic air the fuel ignites automatically without any other catalyst or ignition source.

With reference to FIG. 5, the heat exchange tubes 48 extend from an upstream side 72 through the intra-propellant plate 54 and terminate into the injector plate 52. An injector plate face 52a is downstream of the heat exchange tubes 48. Fuel is provided through the main fuel line 38 to the manifold region 56 which is the area between the intra-propellant plate 54 and the injector plate 52. Although only one main fuel line 38 is illustrated, it will be understood that more than one main fuel line may be provided. Furthermore, it will be understood that the fuel line 38 may enter the manifold from a variety of positions such as from the top, bottom, side or at an angle provided that the fuel still enters the downstream side of the fuel injector port 60. Formed in the injector plate 52 are oxidizer pathways 72 which are extensions of the heat exchange tubes 48 formed in the injector plate 52. The hypergolic air from the heat exchange tubes 48 passes through the oxidizer pathways 72 and exits into the main combustion area 34.

Extending back from the fuel injector port 60 is a fuel injection pathway 74. Each fuel injector port 60 includes at least one fuel injection pathway 74. The fuel injection pathway 74 in one non-limiting embodiment is a bore or aperture formed in the injector plate 52 to allow access to the fuel manifold region 56 so that the fuel which is provided to the fuel manifold region 56 from the main fuel line 38 can reach the main combustion area 34. Generally, the fuel injection pathways 74 are formed in the injector plate 52 and the spaces or lands between the oxidizer pathways 72 which extend from the heat exchange tubes 48.

The fuel exits the fuel injector ports 60 generally as a fuel stream 76 or flow, described more fully here. The fuel stream 76 may have a half angle of greater than about 0° to about 180°. Therefore two of the fuel streams 76 may intersect, in an area of the main combustion area 34 downstream of the injector plate face 52a.

Figure 6A:
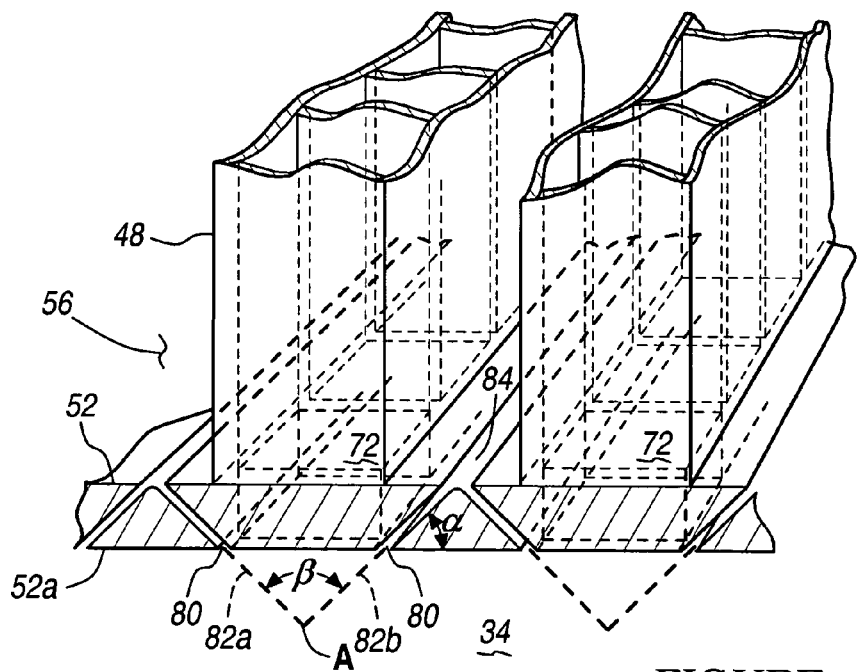
FIG. 6a is a detailed, perspective view of the downstream side of the injector plate according to a first embodiment of the present invention.
Figure 6B:
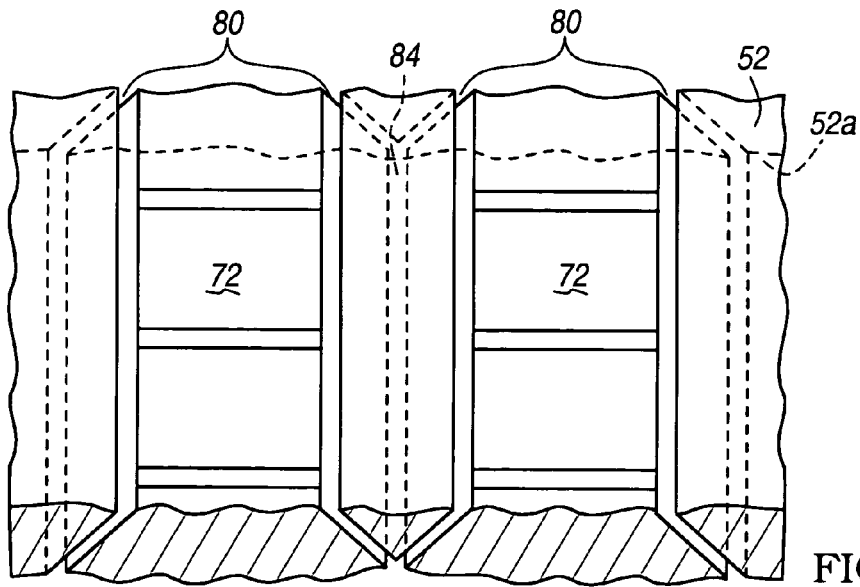

With reference to FIGS. 6A and 6B the injector plate 52 may be connected to the heated heat exchange tubes 48 in a substantially sealing manner. The heat exchange tubes 48 generally connect to the injector plate 52 where a fuel injector slot 80 defines the fuel injector port 60 according to various embodiments. Extending through the injector plate 52 are the oxidizer pathways 72 from which the vitiated or heated air is expelled. The vitiated air flows from the heat exchange tubes 48 through the oxidizer pathways 72 to be mixed with a fuel stream 82 that is expelled from the fuel injector slots 80.

The fuel injector slots 80 may extend from the fuel manifold region 56 through the injector plate 52 to the front side or injector plate face 52a. The upstream side of the fuel injector slot 80 is generally an opening or aperture 84 that is opened to the fuel manifold region 56. The aperture 84 allows fuel that is present in the fuel manifold region 56 to flow through the aperture 84 and through the fuel injector slots 80. The fuel injector slot 80 are generally formed through the injector plate 52 to allow the fuel to flow in a selected direction from the injector plate face 52a and into the main combustion area 34.

The fuel injector slots 80 generally extend the length of the injector plate 52 near the oxidizer pathways 72. As particularly illustrated in FIG. 6B, the fuel injector slot 80 extends near the plurality of the oxidizer pathways 72. Thus one fuel injector slot 80 may provide a fuel stream 82 to a plurality of the oxidizer pathways 72. The fuel injector slots 80 provide a substantially continuous flow of fuel from the fuel manifold region 56 to the main combustion area 34 on the down stream side of the injector plate 52. Because the fuel stream 82 created by the fuel injector slots 80 is substantially continuous, the fuel is provided substantially continuously along the entire area of the main combustion area 34.

The fuel injector slots 80 may be formed at any appropriate angle a relative to the injector plate face 52a. The angle $\alpha$ may be any appropriate angle and is generally greater than about 0° to about 180°. Therefore, the fuel stream 82 provided from the fuel injector slots 80 can be provided at any appropriate angle relative to the fuel injector face 52a downstream of the oxidizer flowing from the oxidizer pathway 72.

A first fuel stream 82a is generally able to intersect with an adjacent fuel stream 82b injected from a fuel injector slot 80 which is on an opposite side of an oxidizer pathway 72. Therefore, two fuel streams 82a, 82b provided from two separate fuel injector slots 80 are generally able to intercept at a point downstream of the oxidizer pathway 72 and mix with the oxidizer flowing from the oxidizer pathway 72. The fuel streams 82a, 82b generally intersect at an angle $\beta$ that is defined at least in part of angle $\alpha$ at which the fuel injector slot 80 is formed through the fuel injector face 52a. It will be understood that the intersection angle $\beta$ may be any appropriate angle that is generally about 0° to about 180°.

The fuel injector slots 80 may be any appropriate width and may generally be between about 0.001 inches and 0.100 inches. The fuel injector slots 80 may also have any appropriate height to provide a fuel stream to any appropriate number of the oxidizer pathways 72. The size may depend upon the flow of the oxidizer from the oxidizer pathway 72, the type of fuel being injected into the main combustion area 34, and any other appropriate considerations. This fuel flow rate from the selected fuel injector slot size to mix with the oxidizer that flows from the oxidizer pathway 72 in a selected manner. The oxidizer which flows from the oxidizer pathway 72 may flow at any appropriate rate, and generally flows between about 50 and about 500 feet per second.

The size of the fuel injector slot 80 in addition to the selection of the angle, the appropriate flow rate, and other considerations may allow the fuel to be injected from the fuel injector slot 80 at a rate and geometry that allow the fuel to mix with the oxidizer which exits the oxidizer pathway 72 at a rate that may allow the fuel to be substantially evenly mixed with the oxidizer before the fuel reaches an auto ignition temperature. As discussed above, various fuels have various auto ignition temperatures and these may be taken into account when determining the size of the injector slots, the angle $\alpha$ and the flow rate of the fuel. Generally, however, the fuel is substantially evenly mixed when the fuel when combusting does not generally produce a hot spot that is able to produce a substantial amount of nitrogen oxide compounds or other selected compounds. Therefore, nitrogen oxide compounds, and other selected compounds, may be reduced by providing a substantial even burning and controlling a temperature in the main combustion area 34.

Nevertheless, the air that exits the oxidizer pathways 72 exits at an approximately hypergolic temperature of the fuel. Therefore, once the fuel is heated to that temperature, the fuel will ignite. The various characteristics, such as the size of the fuel injector slot 80, the flow rate of the fuel, the angle $\alpha$, and other appropriate characteristics may be selected to ensure that the fuel substantially mixes with the oxidizer before the fuel reaches its auto ignition temperature.

Figure 7A:
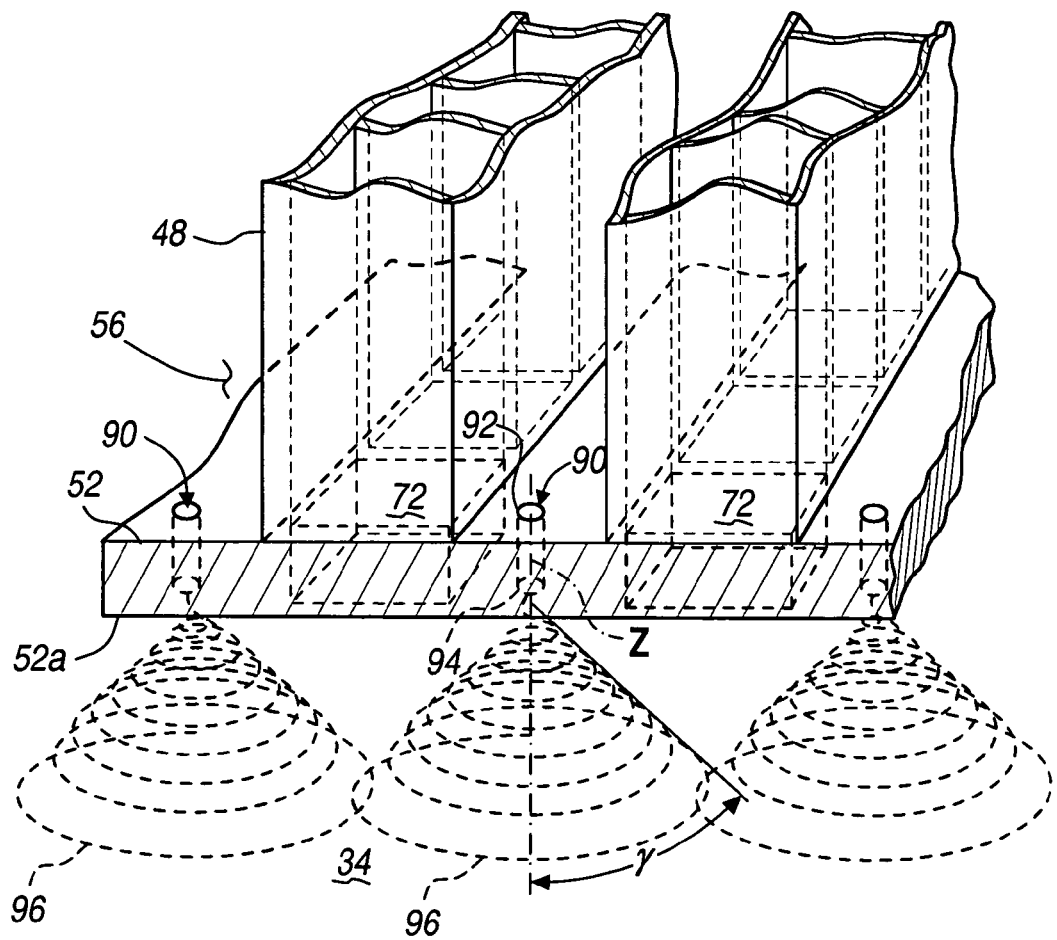
FIG. 7a is a detailed perspective view of a downstream side of the injector plate according to a second embodiment of the present invention.

Various other embodiments of the fuel injector port 60 include injector ports 90 with reference to FIG. 7A. The injector plate 52, as discussed above, includes the fuel manifold region 56 on a first side and the injector plate face 52a on a second side. The heat exchange tubes 48 also operate as heated oxidizer pathway to the main combustion area 34 interconnected with the injector plate 52. The injector plate 52 defines oxidizer pathways from which an oxidizer flows into the main combustion area 34. Generally, the oxidizer flows from the fuel manifold region 56 to the injection plate face 52a. Formed in the injector plate 52 is the injector port 90 that may include a plurality of the injector ports 90.

The injector ports 90 may include an inlet side 92 and an outlet side 94. The outlet side 94 generally includes an aperture which allows fuel to flow from the fuel manifold region 56 to the injector plate face 52a and out the outlet 94 along a selected, generally longitudinal, axis Z. The fuel generally forms a fuel cone 96 that may have any appropriate angle $\gamma$. The angle $\gamma$ is generally greater than about 0° to about 180°. As described herein, the fuel cone 96 is generally formed as the fuel spirals from the injector port 90.

The fuel generally flows from the fuel manifold region 56 because the fuel is under pressure. The injector ports 90 may be formed of any appropriate size according to various considerations. For example, the injector ports 90 may be smaller when a lower flow rate of fuel is desired. In addition, the size of the injector ports 90 may be selected depending upon the fuel type being used. In addition, the injector ports 90 may taper along their length either including a greater diameter or dimension at the outlet side 94 or at the inlet side 92. Therefore, the injector ports 90 may taper in either direction depending upon various characteristics.

Figure 7B:
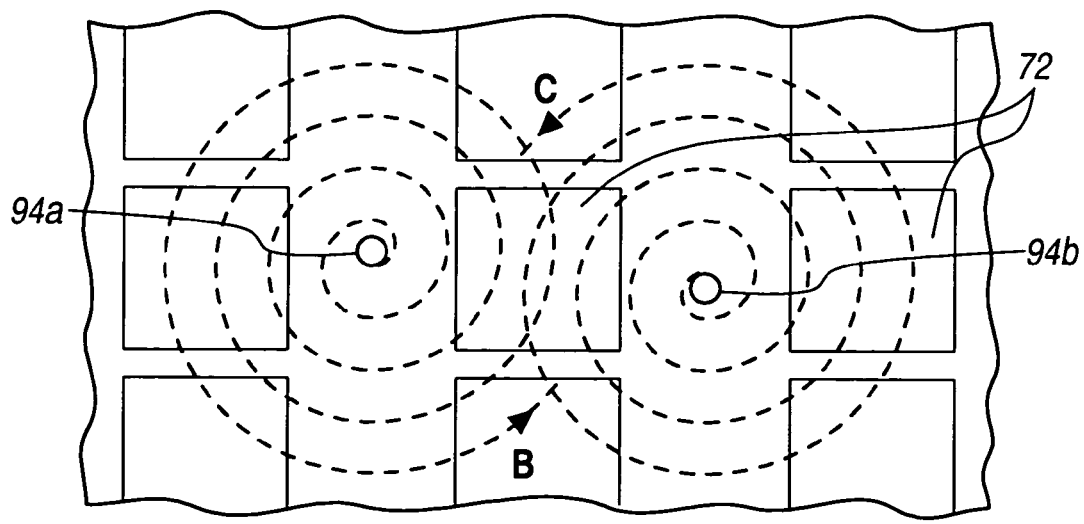

With further reference to FIGS. 7A and 7B, the injector ports 90 generally form a fuel flow 96 that exits the outlet 94 in a substantially spiral or swirl pattern. With particular references to FIG. 7B, a first injector outlet 94a is positioned relative to a second injector outlet 94b. For example, the injector outlets 94a, 94b may be positioned on two sides of one of the oxidizer pathway 72. The fuel exiting the first outlet 94a may spiral in a first direction indicated by arrow B. The fuel exiting from the second injector outlet 94b may spiral in a direction of arrow C. It will be understood that the fuel may also exit each of the injector outlets 94a, 94b in a substantially same direction or in a direction opposite that illustrated. Nevertheless, the fuel generally exits the injector outlets 94a and 94b in a substantially spiraling manner. As discussed herein, various mechanisms may be provided to form the fuel into the spiral patterns that provides the fuel to the main combustion area 34. Nevertheless, the fuel that exits the injector outlets 94a, 94b substantially quickly spreads and thoroughly mixes with the air which exits the oxidizer path 72.

The injector ports 90 may be formed in any appropriate size, as discussed above, and generally about 0.010 inches and about 1.0 inches in diameter. Therefore, the selected amounts of fuel exiting the injector outlets 94a and 94b is able to substantially quickly mix with the vitiated air exiting the oxidizer pathway 72, at least partially because the fuel is swirling. The mixing may occur at least in part because the fuel flow includes a tangential velocity relative to the axis Z of the flow of the oxidizer from the oxidizer pathway 72. Therefore, the fuel is able to substantially quickly mix with the oxidizer that exits the oxidizer path 72. As discussed above, the oxidizer exiting the oxidizer path 72 is generally near the hypergolic or auto ignition temperature of the fuel that exits the fuel outlets 94a. 94b. Therefore, when the fuel substantially mixes with the oxidizer, the fuel is able to ignite and may not create any substantial hot spots.

In addition to the tangential velocity of the fuel, the velocity of the oxidizer which exits the oxidizer pathway 72 assists in substantially thoroughly mixing the fuel with the oxidizer before the fuel reaches the auto ignition temperature. Therefore, the fuel is able to be provided at a selected rate to produce a selected gas to power the gas powered turbine in a selected manner.

Figure 8A:
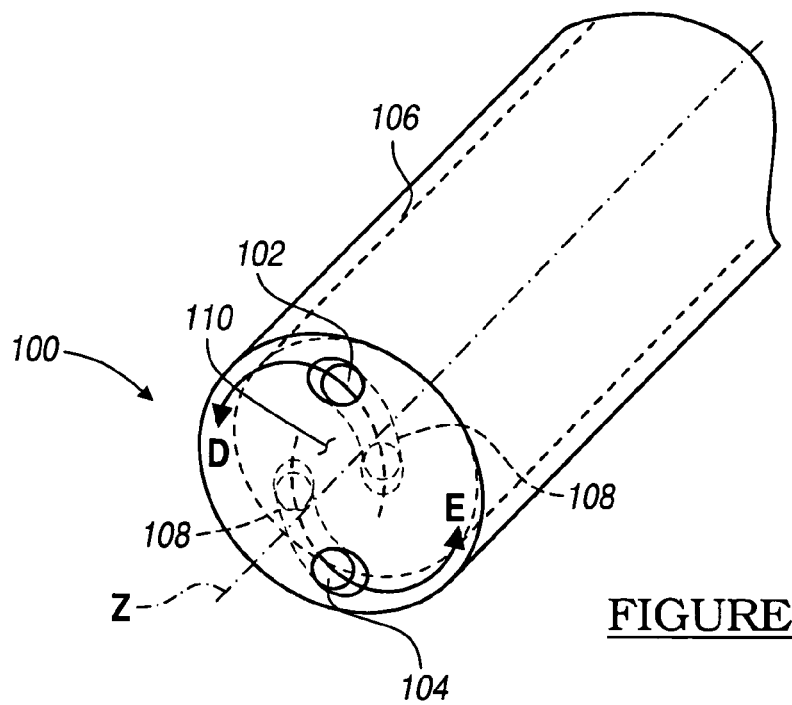
FIG. 8a is a detailed, perspective view of an injector element according to various embodiments.

With reference to FIG. 8A, the injector port 90, according to various embodiments includes an injector element 100. The injector element 100 is used to define the injector port 90 in the injector plate 52. The injector port 90 includes at least a first injector portal 102. The injector element 100 may also include a second injector portal 104. Although the injector element 100 may include any appropriate number of the injector portals 102, 104, the injector element 100 may include only one or a substantial plurality. Nevertheless, the injector portals are generally positioned within the injector element 100 to allow fuel to flow into the injector element 100 in a selected manner.

The fuel may flow from an external fuel region 106 through a fuel portal pathway 108 to the fuel portal 102. The fuel portal pathway 108 begins a fuel pre-stream from the external fuel region 106 to an interior region 110 of the injector element 100. The injector portal in conjunction with the fuel portal pathway 108 may provide the fuel in a fuel pre-stream direction D, and if the second fuel portal 104 is used, a fuel direction pre-stream E.

The pre-streams D, E are in a generally swirling or circular direction defined within the injector element 100, and may be tangential to the axis Z of the injector element 100. The fuel pre-streams D, E may also have a longitudinal direction such that the fuel pre-streams D, E are generally encouraged to exit the injector element 100 in a selected direction. Because the fuel pre-streams D, E are generally swirling within the injector element 100, the fuel stream exiting the injector element 100 may also be generally swirling in the direction defined by the pre-streams D, E. Therefore, the fuel swirls B or C may be defined by internal pre-streams D, E defined within the injector element 100.

Figure 8B:
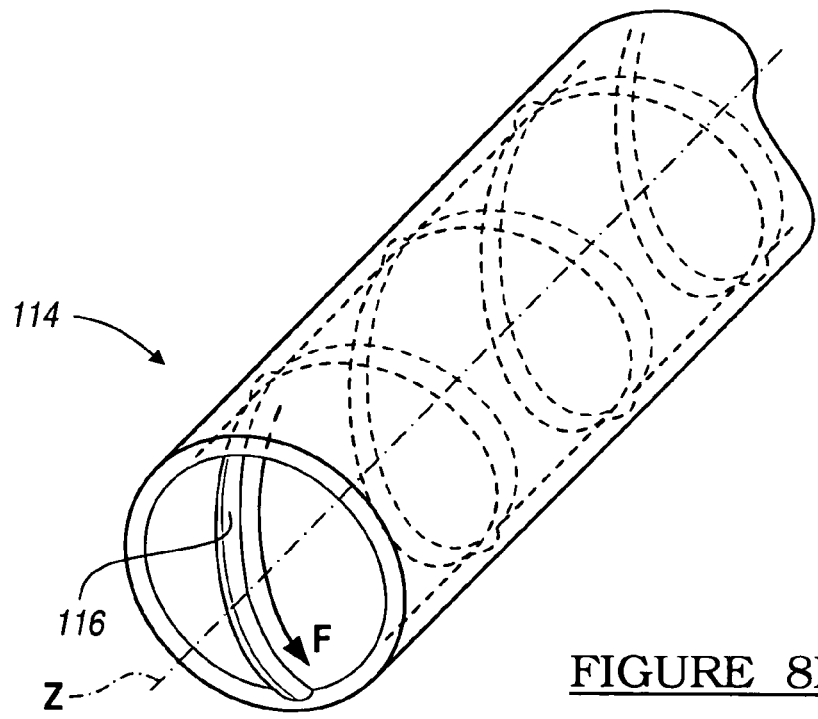
FIG. 8b is an injector element according to various alternative embodiments.

With reference to FIG. 8B, an injector element 114, according to various embodiments, may be used as the injector port 90. The injector element 114 generally defines a swirling element 116 within the injector element 114. The swirling element 116 may be any appropriate structure such as either a groove or a fin. The swirling element 116 imparts a generally swirling direction F to the flow of the fuel as the fuel passes through the injector element 114. The swirling element is operable to interact with the fuel as it flows through the injector element to impart the swirling manner F.

The swirling element 116 may be a groove such as a rifling groove. As the rifling groove imparts spin to a projectile passing therethrough, the swirling element 116 may also impart a swirl to the fuel passing through the injector element 114. Alternatively, the swirling element 116 may be a fin that extends into the injector element 114 to positively interact with the flow of fuel passing through the injector 114. Regardless of the structure of the swirling element 116, the swirling element 116 is able to interact with the fuel to form a swirling motion F of the fuel as the fuel passes through the injection element 114.

Therefore, the injector ports 90 are able to swirl the fuel as it passes through the injector elements to impart a tangential motion of the fuel flow relative to axis Z of the injector ports 90 and the flow of the oxidizer from the oxidizer pathway 72. In addition, the injector ports 90 may be formed at an angle relative to the face 52a of the injector plate 52. Therefore, the fuel may also be provided at an angle relative to the oxidizer pathway 72 in addition to being swirled as discussed above. Regardless, the fuel is able to mix with the oxidizer substantially before the fuel reaches the auto ignition temperature. Therefore, the hot spots are substantially reduced as are the production of unselected elements, such as nitrous oxide compounds.

As discussed above, the air that exits the heat exchanger 45 is at the auto ignition or hypergolic temperature of the fuel used in the gas powered turbine 10. Therefore, as soon as the fuel reaches the temperature of the air, the fuel ignites. Since the fuel is thoroughly mixed with the air, the combustion of the fuel is nearly instantaneous and will not produce any localized or discrete hot spots. Because the fuel is so well mixed with the air exiting the heat exchanger 45, there is no one point or area which has more fuel than any other point, which could also create hot spots in the main combustion area 34. Therefore, the temperature of the air coming from the injector plate 52 and into the main combustion area 34 is substantially uniform. During operation of the gas powered turbine 10, the fuel's characteristic mixing rate is shorter than the combustion rate of the fuel.

The temperature of the air, after the additional fuel has been combusted from the injector plate 52, is between about 1315° C. and 1595° C. (about 2400° F. and about 2800° F.). Preferably, the temperature, however, is not more than about 1426° C. (about 2600° F.). Different fuel to air ratios may be used to control the temperature in the main combustion area 34. The main combustion area 34 directs the expanding gases into a transition tube (not shown) so that it engages the turbine fans 16 in the turbine 15 at an appropriate cross sectional flow shape.

The use of the heat exchanger 45 raises the temperature of the air to create hot or heated air. The hot air allows the catalyst to combust the fuel that has been entrained in the air in the premix chamber 42 without the need for any other ignition sources. The catalyst only interacts with the hydrocarbon fuel and the oxygen in the air to combust the fuel without reacting or creating other chemical species. Therefore, the products of the combustion in the heat exchange tubes 48 are substantially only carbon dioxide and water due to the catalyst placed therein. No significant amounts of other chemical species are produced because of the use of the catalyst. Also, the use of the heat exchange tubes 48, with a catalyst disposed therein, allows the temperature of the air to reach the auto ignition temperature of the fuel so that no additional ignition sources are necessary in the main combustion area 34. Therefore, the temperature of the air does not reach a temperature where extraneous species may be easily produced, such as NOX chemicals. Due to this, the emissions of the gas powered turbine 10 of the present invention has virtually no NOX emissions. That is, that the NOX emissions of the gas powered turbine 10 according to the present invention are generally below about 1 part per million volume dry gas.

Also, the use of the heat exchanger 45 eliminates the need for any other pre-burners to be used in the gas powered turbine 10. The heat exchanger 45 provides the thermal energy to the air so that the catalyst bed is at the proper temperature. Because of this, there are no other areas where extraneous or undesired chemical species may be produced.

Additionally, exemplary equivalence ratios in the premix section may be between about 0.20 and 0.30, while the equivalence ratio of the injector plate 52 is between about 0.50 and about 0.60 for a single 200 MW methane combustor. This means that the fuel combustion will occur as a lean mixture in both areas. Therefore, there is never an excessive amount of fuel that is not combusted. Also, the lean mixture helps to lower temperatures of the air to more easily control side reactions. It will be understood that different fuel ratios may be used to produce different temperatures. This may be necessary for different fuels.

Figure 9:
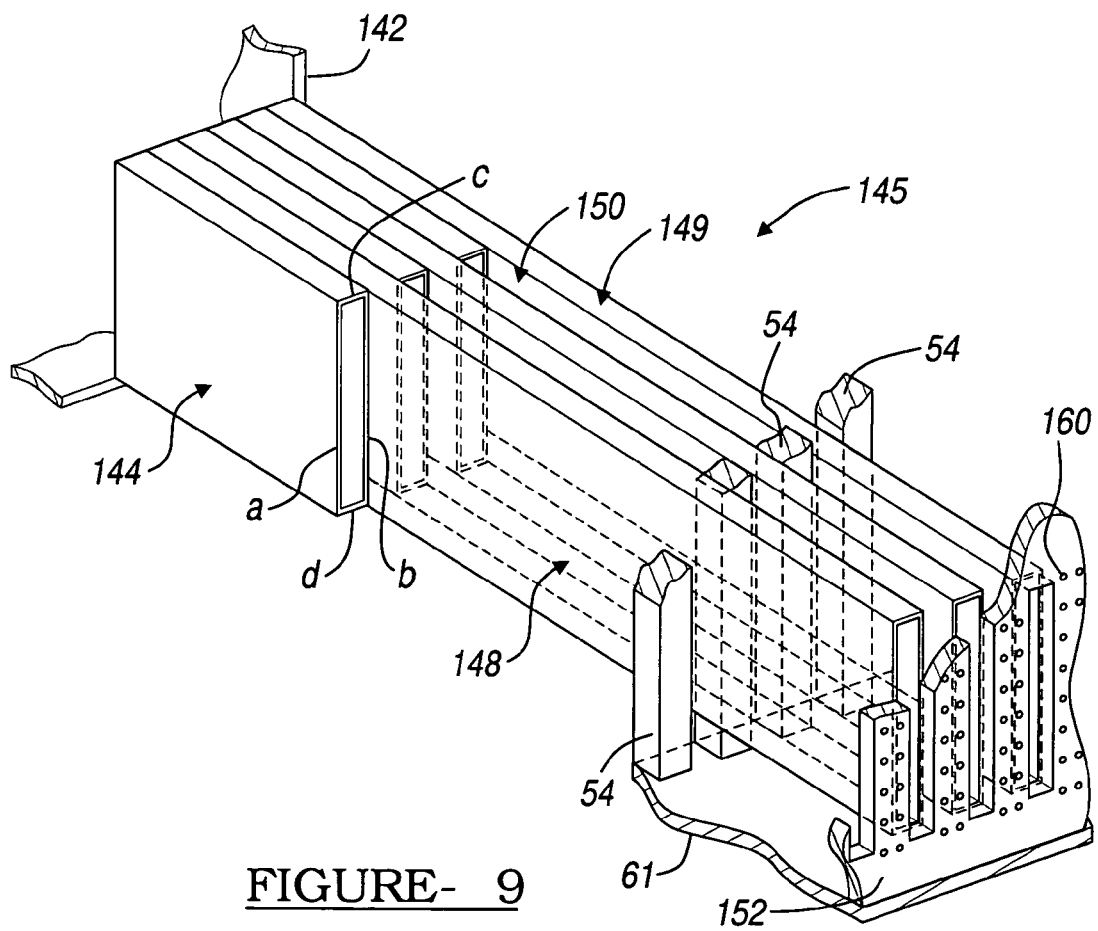
FIG. 9 is a detailed, partial cross-sectional, perspective view of a portion of the heat exchanger according to a second embodiment.

With reference to FIG. 9, a detail portion of the combustion chamber 14, similar to the portion illustrated in FIG. 3, according to various embodiments of a heat exchanger 145 is illustrated. A premix chamber 142 allows air from the compressor to be mixed with a first portion of fuel. Air comes from the compressor and travels through a cooling fin 144 rather than through a plurality of cooling tubes 44, as discussed above in relation to the first embodiment. It will be understood that exit ports may also be formed in the cooling fins 144 to form the premix chamber 142. The cooling fin 144 is defined by two substantially parallel plates 144a, 144b. It will be understood, however, that other portions, such as a top and a bottom will be included to enclose the cooling fin 144. Additionally, a heat exchange or catalyst fin 148 is provided rather than heat exchange tubes 48, as discussed above in the first embodiment. Again, the catalyst fin 148 is defined by side, top, and bottom walls that define a catalyst column 149. Each catalyst column 149, however, is defined by a single catalyst fin 148 rather than a plurality of catalyst tubes 48, as discussed above. The cooling fin 144 may include a plurality of cooling fins 144. Each cooling fin 144, in the plurality, defines a cooling pathway. Similarly, the heat exchange fin 148 may include a plurality of heat exchange fins 148. Each, or the plurality of, heat exchange fins 148 defines a heat exchange or catalyst pathway.

Channels 150 are provided between each of the catalyst fins 148 so that air may flow from the compressor 12 (FIG. 1) through the cooling fins 144 into the premix chamber 142. Air is then pre-mixed with a first portion of fuel and flows back through the catalyst fins 148 to the injector plate 152. Injection ports 160 are provided on the injector plate 152 to inject fuel as the air exits the catalyst fin 148. A suitable number of injection ports 160 are provided so that the appropriate amount of fuel is mixed with the air as it exits the catalyst fins 148. The intra-propellant plate 54 is also provided.

Injector ports 80 90 are provided on the injector plate 152 to provide fuel streams 82 or 92 as heated air exits the oxidizer paths from the catalyst fins 148. Either of the previously described injector ports 60, slots 80, or 90 may be used with the second embodiment of the heat exchanger 145 to provide a substantial mixing of the fuel with the air as the air exits the catalyst fins 148. This allows a substantial mixture of the fuel with the air as the air exits the catalyst fins 148 before the fuel is able to reach ignition temperature. Therefore, the temperatures across the face of the main injector 152 and in the main combustion area 34 are substantially constant without any hot spots where NOX chemicals might be produced.

It will also be understood that the cooling fins 144 may extend into the premix area 142 similar to the cooling tubes 44. Additional ports may be formed in the portion of the cooling fins 144 which extend into the premix area for air to exit the cooling fins 144 and mix with a first portion of fuel. Therefore, the combustor according to the second embodiment may include a premix area 142 substantially similar to the premix area illustrated in FIG. 5, save that the ports are formed in the cooling fins 144 rather than to individual cooling tubes 44. In addition, this alternative embodiment may include a combustion inhibitor to assist in eliminating combustion in the premix area 142.

It will be further understood that the heat exchanger, according to the present invention, does not require the use of individually enclosed regions or modular portions. Rather the heat exchanger may be formed of a plurality sheets, such as corrugated sheets. A first set of these sheets are oriented relative to one another to form a plurality of columns. The first set of sheets includes a catalyst coated on a side facing an associated sheet, such that the interior of the column includes the catalyst to contact the airflow. In this way, the catalyst need not be coated on the interior of a closed space, but rather the space is formed after the catalyst is coated to form the catalyst pathway. Operatively associate with the first set of sheets is a second set of sheets, defining a second set of columns disposed at least partially between the first set of columns. Thus, in a manner similar the heat exchanger 145, heat exchange columns and cooling columns are formed. These then form the catalyst pathway and the cooling pathway in operation of the combustor.

The present invention thus provides an apparatus and method that virtually or entirely eliminates the creation of NOX emissions. Advantageously, this is accomplished without significantly complicating the construction of the gas powered turbine 10 or the combustion chambers 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A combustion system for a gas powered turbine to substantially mix and combust a fuel to substantially eliminate selected emissions, comprising:
   an oxidizer heat exchange tube through which an oxidizer flows into a combustion area;
   an injector plate disposed adjacent said combustion area;
   an oxidizer pathway defined by said injector plate to inject the oxidizer from the oxidizer heat exchange tube into said combustion area;
   a first fuel injector port and a second fuel injector port defined by said injector plate to inject a fuel from each of said first fuel injector port and said second fuel injector port to substantially mix the fuel with the oxidizer, a first fuel stream of the fuel from said first fuel injector port injected into said combustion area to at least partially intersect a second fuel stream of the fuel from said second fuel injector port adjacent to said oxidizer pathway.

2. The combustion system of claim 1, wherein the oxidizer flowing from the oxidizer pathway is generally at a temperature operable to ignite the fuel once the fuel reaches the temperature of the oxidizer.

3. The combustion system of claim 1, wherein said heat exchanger tube abuts said injector plate to define at least a portion of said oxidizer pathway such that said injector plate at least partially defines the oxidizer pathway, the fuel is injected relative to said oxidizer pathway.

4. The combustion system of claim 1, wherein a number of said fuel injector ports to a number of said heat exchanger tubes is a ratio of approximately 4:1.

5. The combustion system of claim 1, wherein said injector port includes a swirl initiator; wherein said swirl initiator initiates a motion of the fuel tangential to the flow direction of the fuel through the injector port.

6. The combustion system of claim 5, wherein said swirl initiator is selected from a group including a groove, a fin, and combinations thereof.

7. The combustion system of claim 5, wherein said tangential motion of the fuel initiated by said swirl initiator allows for substantial mixing of the fuel with the oxidizer that flows out the outlet.

8. The combustion system of claim 1, wherein said injector port includes a slot defined by said injector plate;
wherein said oxidizer flow pathway includes a plurality of said oxidizer flow pathways;
wherein said injector slot extends near at least a sub-plurality of said plurality of oxidizer flow pathways.

9. The combustion system of claim 8, wherein the slot includes a width of about 0.001 to about 0.1 inches.

10. The combustion system of claim 8, further comprising:
an injector port pathway formed through said injector plate at an angle of greater than about 0° to about 180° relative to a face of said injector plate.

11. The combustion system of claim 1, further comprising a plurality of cooling tubes upstream of a pre-mix chamber, said plurality of heat exchanger tubes downstream of said pre-mix chamber.

12. The combustion system of claim 11, wherein said plurality of cooling tubes are generally parallel with said plurality of heat exchanger tubes.

13. The combustion system of claim 12, wherein said plurality of cooling tubes are of a length less than said plurality of heat exchanger tubes.

14. An injector plate for injecting a fuel into a combustion area of a combustor for a gas powered turbine to be combusted by an oxidizer, the injector plate comprising:
a plurality of oxidizer pathways to direct an oxidizer into a combustion area;
a first fuel injector port and a second fuel injector port disposed near said plurality of oxidizer pathways to inject a selected portion of the fuel into the oxidizer, to substantially mix the fuel with the oxidizer before the fuel reaches an ignition temperature,
a first fuel stream of the fuel from said first fuel injector port injected into said combustion area to at least partially intersect a second fuel stream of the fuel from said second fuel injector port adjacent to the oxidizer from at least a sub-plurality of said plurality of oxidizer pathways.

15. The injector plate of claim 14, wherein said injector outlet includes a slot including a length generally greater than the width;
wherein said length spans said plurality of oxidizer pathways.

16. The injector plate of claim 14, wherein each of said first fuel injector port and said second fuel injector port generally includes a width of about 0.001 inches to about 0.1 inches.

17. The injector plate of claim 14, further comprising:
an injector plate face which defines said first fuel injector port and said second fuel injector port, a first fuel injection pathway through said injector plate in communication with said first fuel injector port and a second fuel injection pathway through said injector plate in communication with said second fuel injector port, said first fuel injection pathway formed at an angle relative to said second fuel injection pathway.

18. The injector plate of claim 17, wherein said angle is greater than about 0° to about 180°.

19. The injector plate of claim 14, wherein a said first fuel injector port is positioned on a first side of said sub-plurality of oxidizer pathways and said second fuel injector port is positioned on a second side of said sub-plurality of oxidizer pathways such that a fuel stream injected into said combustion area from each of said first fuel injector port and said second fuel injector port intersect at an angle, said angle greater than about 0° to about 180°.

20. A combustion system for a gas powered turbine, comprising:
an injector plate adjacent a combustion area, said injector plate defines a plurality of oxidizer pathways, a first fuel injector port and a second fuel injector port, said plurality of oxidizer pathways operable to inject an oxidizer into said combustion area, said first fuel injector port and said second fuel injector port operable to respectively inject a first fuel stream from said first fuel injector port into said combustion area to at least partially intersect a second fuel stream from said second fuel injector port downstream of at least one of said plurality of oxidizer pathways to substantially mix the fuel with the oxidizer.

21. The system as recited in claim 20, wherein the fuel mixes with the oxidizer before the fuel reaches an auto-ignition temperature.

22. The system as recited in claim 20, further comprising a first fuel injection pathway through said injector plate in communication with said first fuel injector port and a second fuel injection pathway through said injector plate in communication with said second fuel injector port, said first fuel injection pathway formed at an angle relative to said second fuel injection pathway.

23. The system as recited in claim 22, wherein said angle is between about 0° and about 180°.

24. The system as recited in claim 22, wherein said first fuel injection pathway and said second fuel injection pathway extend along at least a sub-plurality of said plurality of oxidizer pathways.

25. The system as recited in claim 20, further comprising an intra-propellant plate adjacent to said injector plate to define a fuel manifold region between said intra-propellant plate and said injector plate.

26. The system as recited in claim 25, further comprising a multiple of oxidizer heat exchanger tubes which extend through said intra-propellant plate to said injector plate, each of said multiple of oxidizer heat exchanger tubes in communication with one of said plurality of oxidizer pathways through said injector plate.

* * * * *

UNITED STATES PATENT AND TRADEMARK OFFICE
CERTIFICATE OF CORRECTION

| | |
|---|---|
| PATENT NO. | : 7,469,544 B2 |
| APPLICATION NO. | : 10/683749 |
| DATED | : December 30, 2008 |
| INVENTOR(S) | : Farhangi |

It is certified that error appears in the above-identified patent and that said Letters Patent is hereby corrected as shown below:

Claim 19, Column 16, line 9: delete "a"

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,469,544 B2
APPLICATION NO. : 10/683749
DATED : December 30, 2008
INVENTOR(S) : Farhangi It is certified that error appears in the above-identified patent and that said Letters Patent is hereby corrected as shown below:

ON THE TITLE PAGE:

The Assignee should read as follows:

(73) Assignee: Pratt & Whitney Rocketdyne, Inc., Canoga Park, CA (US)

Signed and Sealed this

Twenty-first Day of April, 2009

JOHN DOLL
*Acting Director of the United States Patent and Trademark Office*